US012403434B2

(12) United States Patent
Pettingill et al.

(10) Patent No.: US 12,403,434 B2
(45) Date of Patent: Sep. 2, 2025

(54) PRINT MATERIAL CONTAINER

(71) Applicant: HEWLETT-PACKARD DEVELOPMENT COMPANY, L.P., Spring, TX (US)

(72) Inventors: Justin Pettingill, Boise, ID (US); Ricardo Osuna, Boise, ID (US); Sean Daniel Fitzgerald, Boise, ID (US); Gabriel Mcdaniel, Boise, ID (US); Juan Guzman, Boise, ID (US); William Mcneil, Boise, ID (US); Melissa Rhea Roberts, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 749 days.

(21) Appl. No.: 17/641,587

(22) PCT Filed: Feb. 6, 2020

(86) PCT No.: PCT/US2020/016962
§ 371 (c)(1),
(2) Date: Mar. 9, 2022

(87) PCT Pub. No.: WO2021/158223
PCT Pub. Date: Aug. 12, 2021

(65) Prior Publication Data

US 2022/0297074 A1 Sep. 22, 2022

(51) Int. Cl.

| | |
|---|---|
| ***B01F 35/213*** | (2022.01) |
| ***B01F 33/501*** | (2022.01) |
| ***B01F 35/22*** | (2022.01) |
| ***B01F 35/32*** | (2022.01) |
| ***G03G 15/10*** | (2006.01) |

(52) U.S. Cl.
CPC .... *B01F 35/2202* (2022.01); *B01F 33/50111* (2022.01); *B01F 35/213* (2022.01); *B01F 35/32021* (2022.01); *G03G 15/104* (2013.01)

(58) Field of Classification Search
CPC .............................. B01F 35/211; B01F 35/213
USPC .......................................................... 366/142
See application file for complete search history.

(56) References Cited

U.S. PATENT DOCUMENTS

| | | | | |
|---|---|---|---|---|
| 2002/0036802 | A1 | 3/2002 | Tojo et al. | |
| 2006/0187743 | A1* | 8/2006 | Carreras ................. | B01F 31/24 366/601 |
| 2007/0291063 | A1 | 12/2007 | Akase et al. | |
| 2008/0317481 | A1 | 12/2008 | Nagano et al. | |
| 2012/0183311 | A1 | 7/2012 | Hasegawa | |
| 2015/0146496 | A1* | 5/2015 | Lucon ........................ | B01J 2/18 366/111 |

(Continued)

FOREIGN PATENT DOCUMENTS

| | | |
|---|---|---|
| CN | 1618616 A | 5/2005 |
| CN | 101045403 A | 10/2007 |

(Continued)

*Primary Examiner* — David L Sorkin
(74) *Attorney, Agent, or Firm* — Foley & Lardner LLP

(57) ABSTRACT

A print material container comprising a body to hold print material, a housing, and a detecting member. The housing being coupled to the body and including a movable mass to move in the housing when a shaking force is applied to the print material container. The detecting member to detect the shaking force and to signal a feedback of the shaking force relative to a shaking force threshold.

19 Claims, 14 Drawing Sheets

(56) References Cited

U.S. PATENT DOCUMENTS

| | | | |
|---|---|---|---|
| 2016/0033902 | A1 | 2/2016 | Kobayashi |
| 2018/0341206 | A1 | 11/2018 | Miyanishi et al. |
| 2021/0170773 | A1 | 6/2021 | Ellis et al. |

FOREIGN PATENT DOCUMENTS

| | | | |
|---|---|---|---|
| CN | 101329534 | A | 12/2008 |
| CN | 101673072 | A | 3/2010 |
| CN | 102591174 | A | 7/2012 |
| CN | 108859418 | A | 11/2018 |
| CN | 108995380 | A | 12/2018 |
| CN | 109890622 | A | 6/2019 |
| CN | 109939601 | A | 6/2019 |
| DE | 4019608 | A1 | 1/1991 |
| JP | H9-281808 | A | 10/1997 |
| KR | 10-2005-0058119 | A | 6/2005 |

* cited by examiner

PRINT MATERIAL CONTAINER

BACKGROUND

An image forming apparatus is an apparatus for forming an image on a recording medium or in a space according to an input signal. Representative examples of the apparatus include a printer, a copy machine, a facsimile, a multifunction peripheral (MFP) that integrally implements these functions, a 3D printer, a Biologic printer, an Ink or liquid solution printer, a piezo-electric printer, a pressurized printer, a vacuum printer, a disbursement printer, and derivatives thereof that form images or objects.

One example of an image forming apparatus is a solution that uses an electro-photographic image forming apparatus using an electro-photographic method that forms a visible image utilizing particulates and/or polymers such as toner on a photoconductor by supplying toner to an electrostatic latent image formed on the photoconductor, transfers the toner image by using an intermediate transfer medium, a direct transfer medium, or a chasm-crossing attraction-based transfer medium, and then fixes the transferred toner image on a recording medium.

In other words, the image forming apparatus uses print materials, such as toner, located in a print material container to print an image on the recording medium. As the print material is used in image forming operations, the print material is used up after a certain time period.

DETAILED DESCRIPTION

Figure 1:
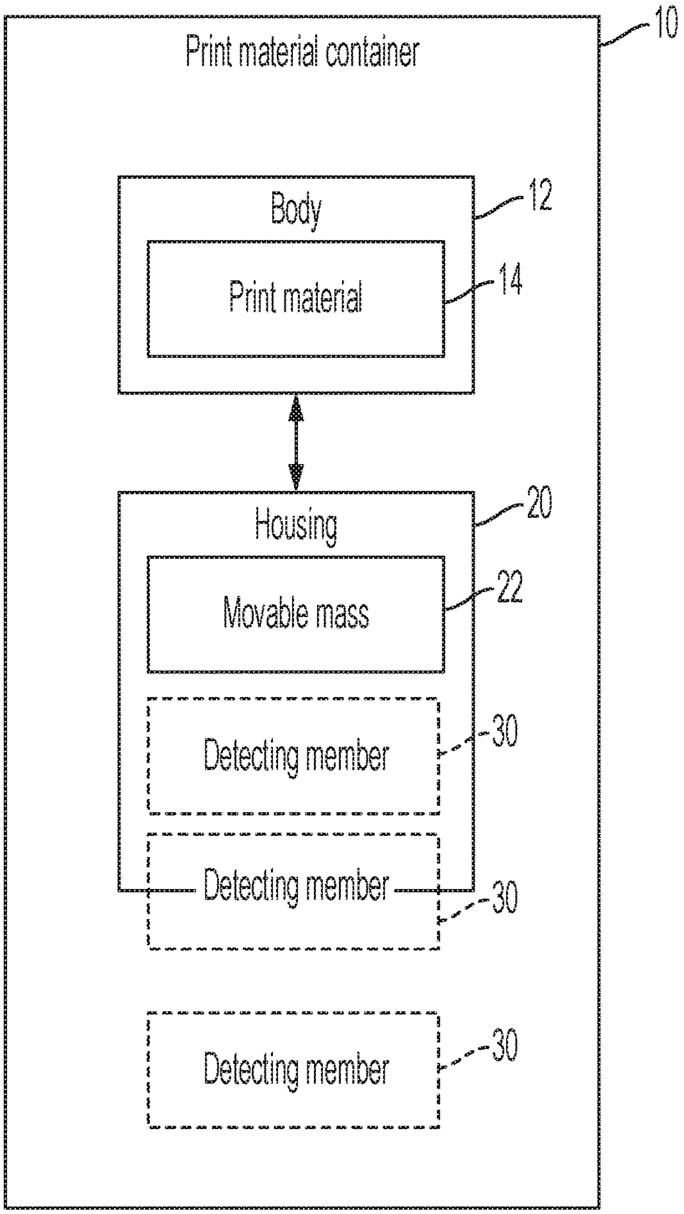
FIG. 1 is a block diagram of a configuration of a print material container, according to an example.

Various examples of the disclosure will now be described in greater detail with reference to the accompanying drawings, wherein like reference characters denote like elements, Examples to be explained in the following may be modified and implemented in various different forms.

When it is stated in the disclosure that one element is "connected to" or "coupled to" another element, the expression encompasses not only an example of a direct connection or direct coupling, but also a connection with another element interposed therebetween. Further, when it is stated herein that one element "includes" another element, unless otherwise stated explicitly, it means that yet another element may be further included rather than being excluded.

As used herein, including in the claims, the word "or" is used in an inclusive manner. For example, "A or B" means any of the following: "A" alone, "B" alone, or both "A" and "B".

An "image forming apparatus" refers to a device for printing print data generated from an external source such as from a central or independent computing-function device or mobile device (such as a smartphone) or memory containing devices (such as a "thumb-drive") via an electrical or data connection on a recoding medium. The recording medium may include, for example, paper such as glossy paper, plain paper, art paper, overhead projector film, cardstock, a personal or industrial application such as onto or within a space or region of space, or onto a host solution delivering chemical processes to support the printed material in biologic application, and the like. Examples of the image forming apparatus described above may include a copier, a printer, a facsimile, a multi-function printer (MFP) of complexly implementing functions thereof through a single device, a 3D printer, a Biologic printer, an ink or liquid solution printer, a piezo-electric printer, a pressurized printer, a vacuum printer, a disbursement printer, and derivatives thereof that form images or objects. The image forming apparatus may mean all devices capable of performing an image forming task, such as the printer, the scanner, the fax machine, the multi-function printer (MFP), or a display.

A print material container may also be referred to as a print material cartridge.

The print material in a print material container may become compacted during shipping, and may also become highly dispersed in the print material container toward the end of life of the print material container. In order to reduce compaction of the print material before initial use of the print material container in an image forming apparats and/or to consolidate the print material toward the end of life of the print material container, shaking of the print material container may be used. Shaking the print material container prior to inserting the print material container in the printer helps return the print material to its optimal printing condition. However, it is difficult for a user to know how much shaking work gets the print material to its optimal printing condition.

In addition, toward the end of life of the print material container, print material may become unevenly dispersed in the print material container. Shaking the print material container toward the end of life of the print material container may help disperse the print material throughout the print material container which may help most to all of the print material inside the print material container to be used. This helps reduce waste and improves efficiency. However, it is difficult for a user to know how much shaking work enables the use of most to all of the print material inside the print material container.

It is necessary for the print material container to be shook with enough force to properly reduce compaction of the print material and/or consolidate the print material. The various embodiments discussed below may help determine whether a print material container is shook with a determined force to reduce compaction of the print material and/or consolidate the print material. In addition, the various embodiments discussed below may also indicate whether the print material container is shook with the determined force to reduce compaction of the print material and/or consolidate the print material.

FIG. 1 shows a view of a print material container 10. The print material container 10 includes a body 12, housing 20, and a detecting member 30. The body 12 is to hold print material 14, The housing 20 is coupled to the body 12. The housing 20 includes a movable mass 22 to move in the housing 20 when a shaking force is applied to the print material container 10. The detecting member 30 is to detect the shaking force and is to signal a feedback of the shaking force relative to a shaking force threshold. The detecting member 30 may be located in the housing 20, coupled to the housing 20, and/or located outside of the housing 20.

It is desirable for the print material container 10 to be shook above a certain threshold prior to inserting the print material container 10 in an image forming apparatus to reduce compaction of the print material 14 before initial use of the print material container 10 in an image forming apparats. The shaking force threshold may be set at a value determined to reduce compaction of the print material 14 to return the print material 14 to a desired printing condition. In addition, is desirable for the print material container 10 to be shook above a certain threshold toward the end of life of the print material container 10 to disperse the print material 14 throughout the print material container 10 which may help most to all of the print material 14 inside the print material container 10 to be used. The shaking force threshold may be set at a value determined to disperse the print material 14 throughout the print material container 10.

When a shaking force is applied to the print material container 10, the shaking force causes the movable mass 22 to move in the housing 20. The detecting member 30 detects the shaking and may also determine whether the shaking force is above the shaking force threshold. The detecting member 30 then signals feedback to indicate whether the applied shaking force is above the shaking force threshold or not.

Since the detecting member 30 signals feedback that indicates whether the applied shaking force is above the shaking force threshold or not, a user will be able to understand if the print material container 10 has been shaken enough or if the print material container 10 needs to be shaken some more and/or with greater force.

Figure 2:
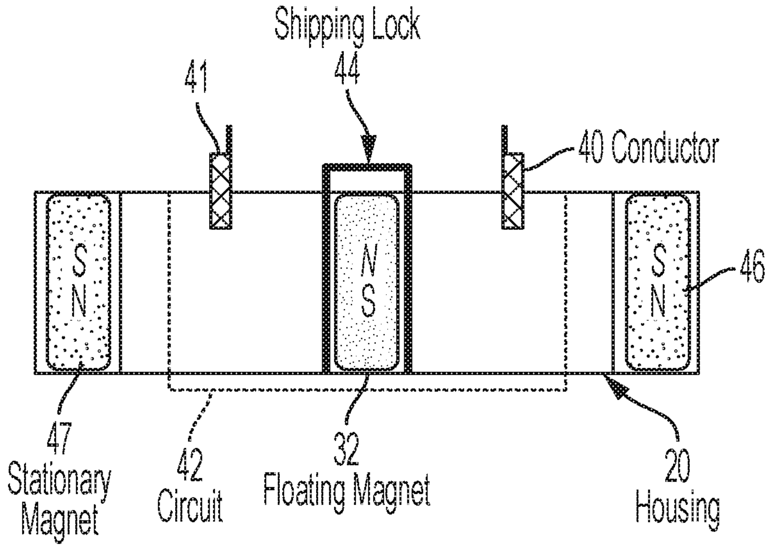
FIG. 2 is a view of a housing with a passive mechanical magnetic system to detect shaking, according to an example.

FIG. 2 shows an example of the housing 20 coupled to the print material container 10 with a passive mechanical magnetic system to detect shaking as the detecting member 30. In this example, the movable mass is a movable magnet 32. The detecting member 30 includes a first movable conductor 40, a second movable conductor 41, and circuitry 42. The first movable conductor 40, which is connectable to complete a circuit, is located on an outer edge of the housing 20 on a first side of the movable magnet 32. The second movable conductor 41, which is connectable to complete a circuit, is located on the outer edge of the housing 20 on a second side of the movable magnet 32. The second side is on an opposite of the movable magnet 32 than the first side. The circuitry 42 is located at a first end and at a second end on the outer edge of the housing 20. The first end and the second end located on opposite sides of the movable magnet 32.

When the applied shaking force is above the shaking force threshold, the movable magnet 32 is to move the first movable conductor 40 to contact the circuitry 42 at the first end of the housing and to move the second movable conductor 41 to contact the circuitry 42 at the second end of the housing to complete a circuit.

As the print material container 10 is shaken, the movable magnet 32 is forced to move inside the housing 20. When the movable magnet 32 comes into contact with either the first movable conductor 40 or the second movable conductor 41, the moment force from the shaking moves the conductors 40, 41 a distance by overcoming friction between the movable conductors 40, 41 and the housing 20. Once the movable conductors 40, 41 are moved to a position to contact the circuitry 42, the circuit is complete. The amount of friction to overcome to move the movable conductors 40, 21 to contact the circuitry 42 may be set at a threshold that is determined to have a shaking force to move the conductors to be equal to the shaking force needed to properly disperse the print material throughout the print material container 10 either before initial insertion to an image forming apparatus or at the end of life of the print material container 10.

The print material container 10 may further include a first stationary magnet 46 located at an end of housing 20 on the first side of the movable magnet 32. The print material container 10 may also further include a second stationary magnet 47 may be located at an end of the housing 20 on the second side of the movable magnet 32. After the shaking force is depleted, the stationary magnets 46, 47 may force the movable magnet 32 to the center of the housing 20.

As an example, the housing 20 may be shaped as a cylinder, a rectangular box, a cube, or a variety of other shapes and sizes. The movable magnet 32 and the stationary magnets 46, 47 may be shaped to coincide with the shape of the housing 20.

When the circuit is complete, the detecting member 30 signals the applied shaking force is above the shaking force threshold. The detecting member may send a signal to an image forming apparatus when the print material container 10 is inserted into the image forming apparatus to indicate that the shaking force is above the shaking force threshold. The detecting member 30 may also visually indicate the print material container 10 has been shaken properly. This may be done with different colors, such as green indicating enough shaking force has been applied and red indicating that not enough shaking force has been applied and that the print material container 10 needs to be shook again. However, a variety of different colors may be used to indicate whether the print material container 10 has been shaken enough. Any other visual or audio indicators may also be used to indicate to a user that the print material container 10 has been shake properly. Therefore, a user will be able to understand if the print material container 10 has been shaken enough.

The print material container 10 may further include a removable shipping lock 44 located around the movable magnet 32 to prevent contact between the movable magnet 32 with the first movable conductor 40 and the second movable conductor 41. The removable shipping lock 44 is to be removed when the print material container 10 is to be inserted into an image forming apparatus and before shaking force is applied to the print material container 10.

Figure 3:
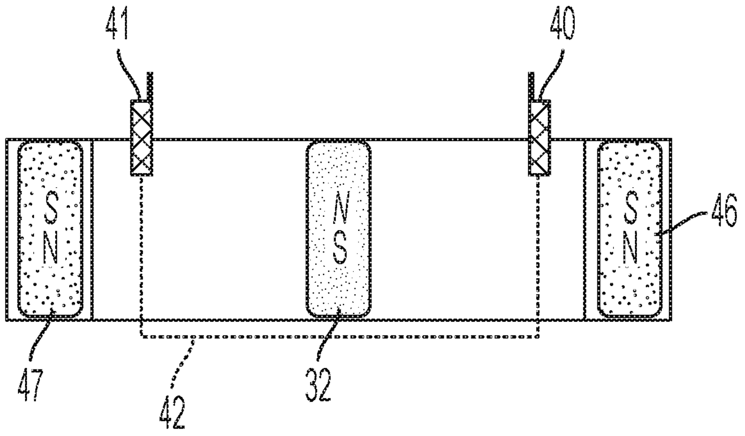
FIG. 3 is a view of a housing with the passive mechanical magnetic system to detect shaking after an shaking force threshold is reached, according to an example.

FIG. 3 shows an example of the housing 20 after the movable 32 has moved the first movable conductor 40 to contact the circuitry 42 and has moved the second movable conductor 41 to contact the circuitry 42 to complete the circuit. Since the circuit is complete, the detecting member may then signal the applied shaking force is above the shaking force threshold.

Figure 4:
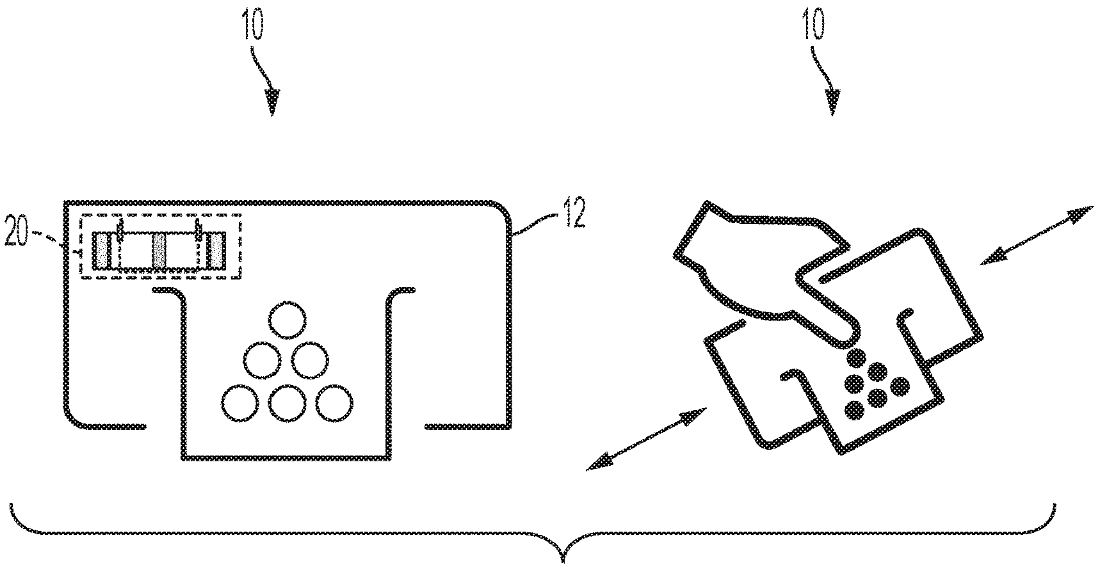
FIG. 4 is a view of a print material container with a passive mechanical magnetic system to detect shaking, according to an example.

FIG. 4 shows an example of the housing 20 coupled to the print material container 10 with a passive mechanical magnetic system to detect shaking as the detecting member. As can be seen in FIG. 4, the housing 20 is coupled to the body 12 of the print material container 10. The print material container 10 may include indicators to shake the print material container in a direction that aligns with the direction the movable magnet 32 is able to move.

Figure 5A:
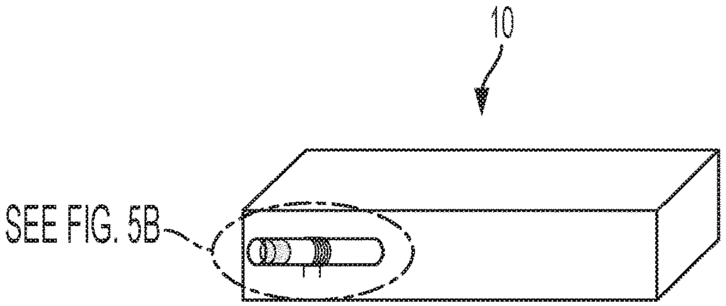
FIGS. 5A and 5B are a view of a housing with a passive magnet energy storage to detect shaking, according to an example.
Figure 5B:
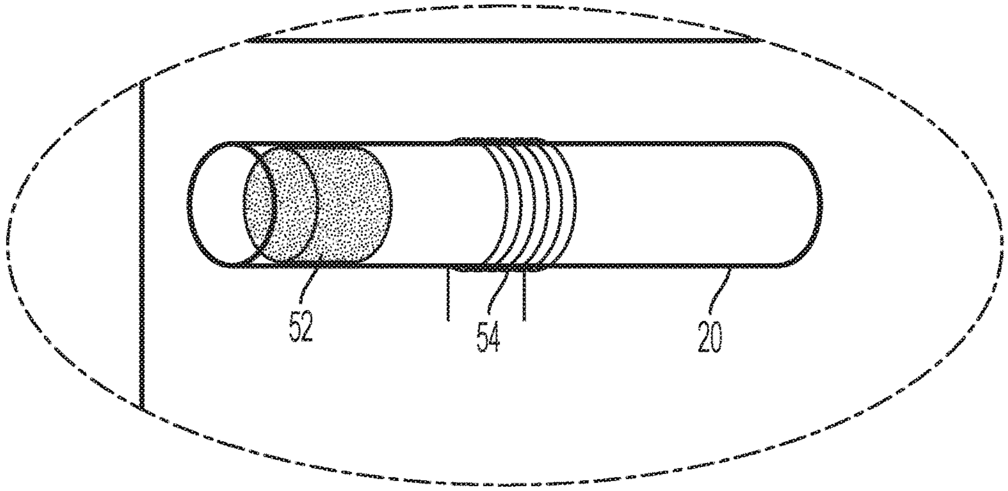

FIGS. 5A and 5B show an example of the housing 20 coupled to the body of the print material container 10 with a passive magnet energy storage to detect shaking as the detecting member.

In this example, the movable mass is a movable magnet 52. The detecting member includes a stator 54 located on an outer edge of the housing 20. When the movable magnet 52 moves in the housing 20 and passes through the stator 54 due to the shaking force, the stator 54 produces an electric current based on the movable magnet 52 moving through the stator 54. Thus, the stator 54 produces an electric current based on an amount of the shaking force applied to the print material container. The stator 54 may also be field windings.

When the amount of the shaking force is above the shaking force threshold, the stator 54 produces and transmits an electric current above an electric current threshold to indicate the amount of the shaking force is above the shaking force threshold.

The housing 20 may be shaped as a cylinder, a rectangular box, a cube, or a variety of other shapes and sizes. The movable magnet 52 may be shaped to coincide with the shape of the housing 20.

Figure 6:
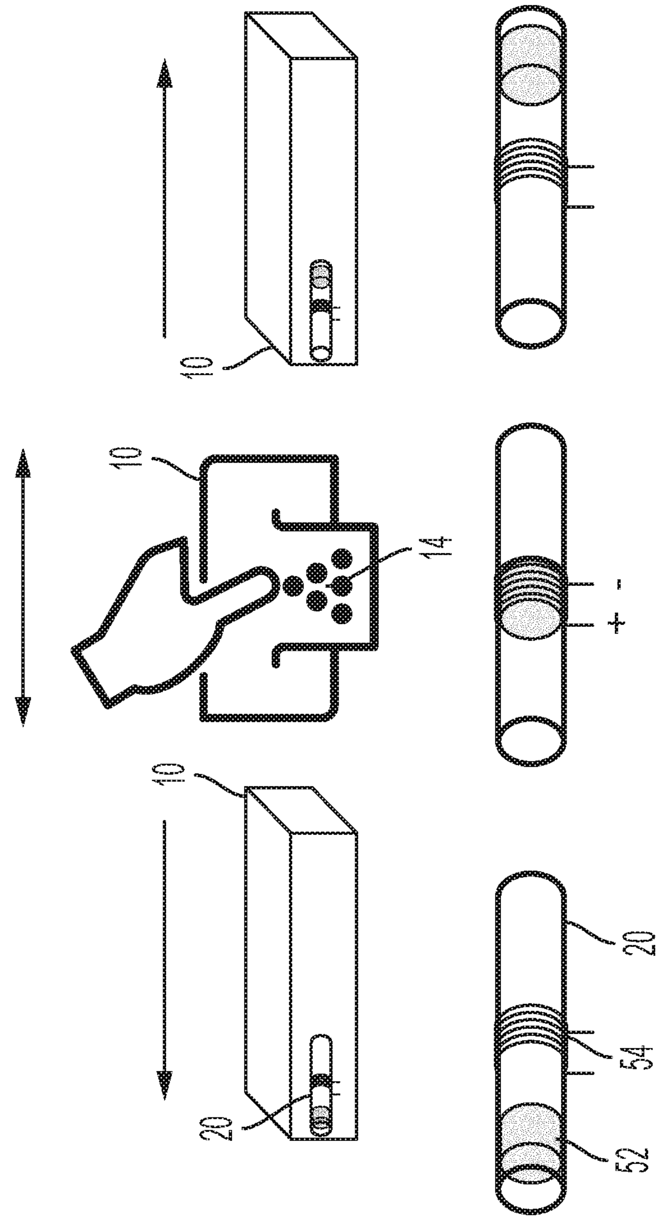
FIG. 6 is a view of a print material container with a passive magnet energy storage to detect shaking, according to an example.

FIG. 6 shows an example of the housing 20 coupled to the print material container 10 with a passive magnet energy storage to detect shaking as the detecting member. The movable magnet 52 is able to move back and forth though the housing when the print material container 10 is shook. The print material container 10 may include indicators to shake the print material container in a direction that aligns with the direction the movable magnet 52 is able to move.

Figure 7:
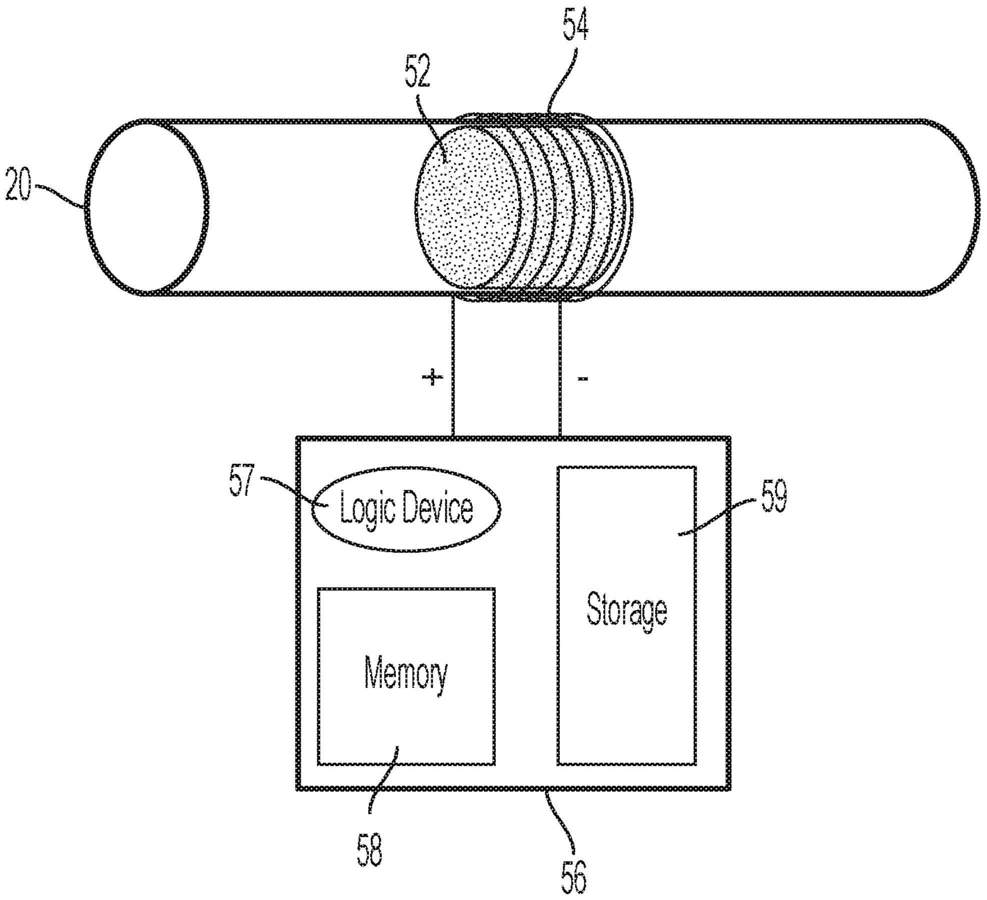
FIG. 7 is a view of the stator coupled to a control board; according to an example.

FIG. 7 shows an example of the housing 20 coupled to the print material container 10 with a passive magnet energy storage to detect shaking as the detecting member. A control board 56 is coupled to the stator to help detect the current produced in the stator 54 when the housing 20 is shook. The control board 56 may include a logic device 57, a memory 58, and/or a storage 59. The storage 59 is to house energy created as the movable magnet 52 moves through the stator 54. This energy may be used to power the other components of the control board 56. The logic device 57 may perform computational algorithms to determine if the current is above or below an electric current threshold. The electric current threshold would correspond to the shaking force threshold. The memory 58 may record and save information. The memory 58 may include information detailing a relationship between the electric current threshold and the shaking force threshold. The memory 58 may also store information indicating whether the print material container 10 is shaken above the shaking force threshold. Since the energy used to power the control board 56 is provided by the stator 54 due to the movable magnet 52 moving through the stator 54, an external power source may not be needed to operate the control board 56 and to detect the shaking of the print material container 10.

The electric current threshold may be set to correspond to the amount of shaking force to properly disperse the print material throughout the print material container 10 either before initial insertion to an image forming apparatus or at the end of life of the print material container 10.

Figure 8:
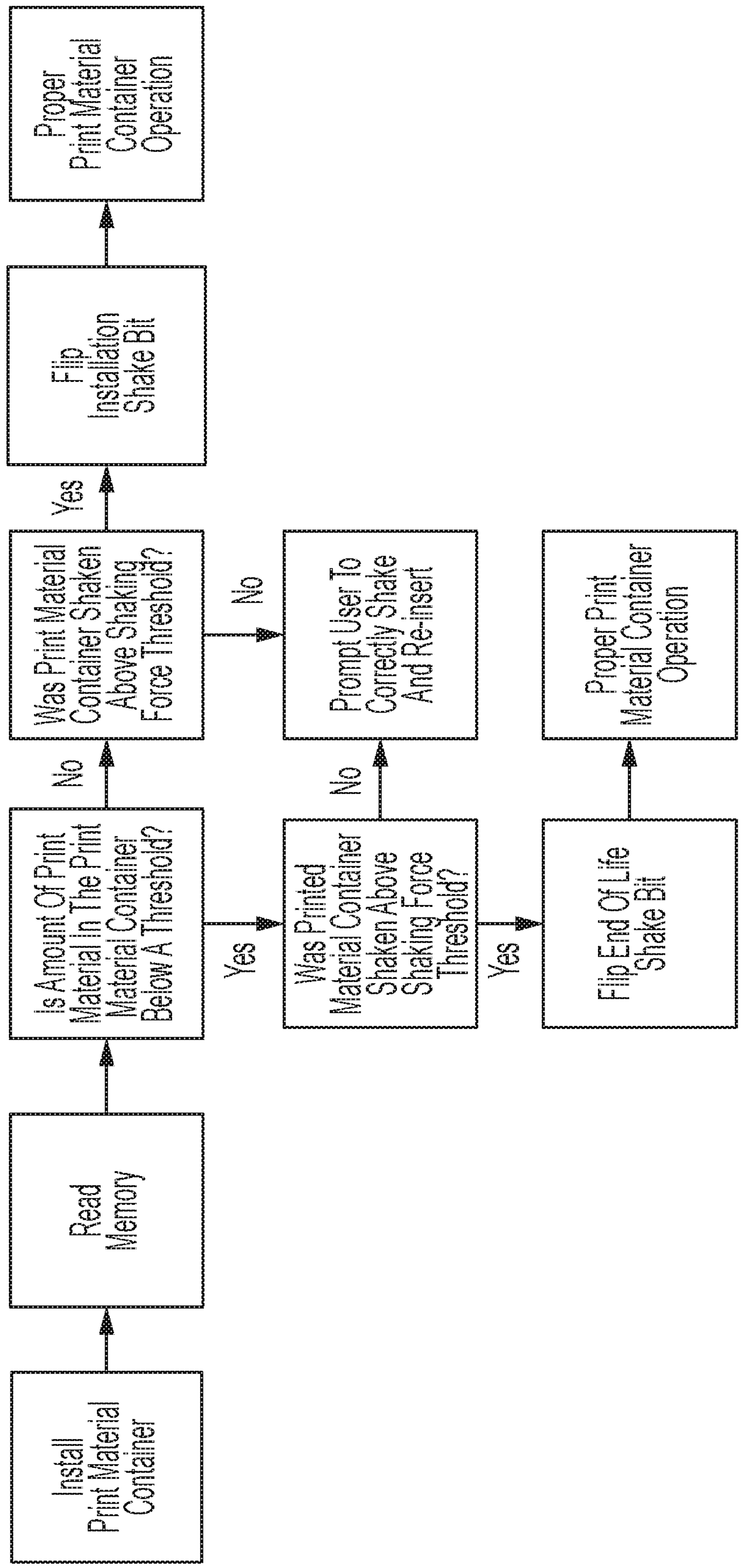
FIG. 8 is a view of operational logic of the control board, according to an example.

FIG. 8 shows an example of operational logic of the control board 56. When the print material container is installed, the memory 58 is read to determine if an amount of print material in the print material container is below a threshold.

If the amount of print material is above a threshold, the memory 58 is read to determine if the print material container was shaken above the shaking force threshold. If it is determined the print material container was shaken above the shaking force threshold, the control board transmits a signal to indicate the print material container is ready to use. If it is determined the print material container was shaken below the shaking force threshold, the control board transmits a signal to indicate to a user to shake the print material container more.

If the amount of print material is below a threshold that indicates the print material container is at the end of life of the print material container, the memory 58 is read to determine if the print material container was shaken above a shaking force threshold. If it is determined the print material container was shaken above the shaking force threshold, the control board transmits a signal to indicate the print material container is ready to use. If it is determined the print material container was shaken below the shaking force threshold, the control board transmits a signal to indicate to a user to shake the print material container more.

Figure 9A:
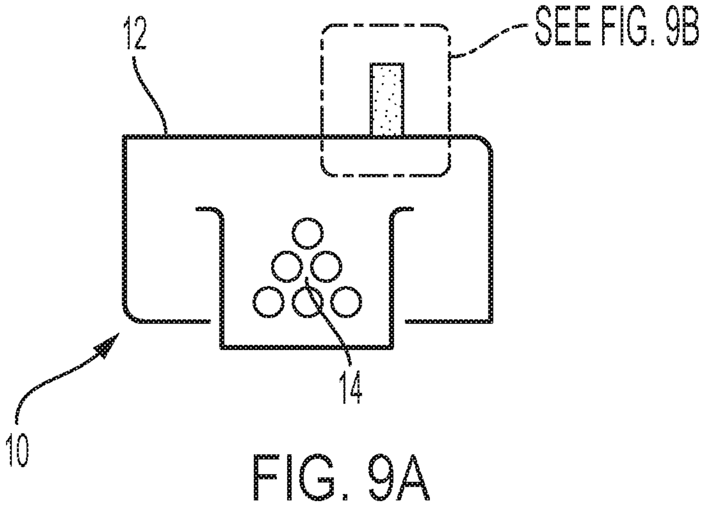
FIGS. 9A and 9B are a view of a housing with a detector supply key to feedback to indicate shake detection, according to an example.
Figure 9B:
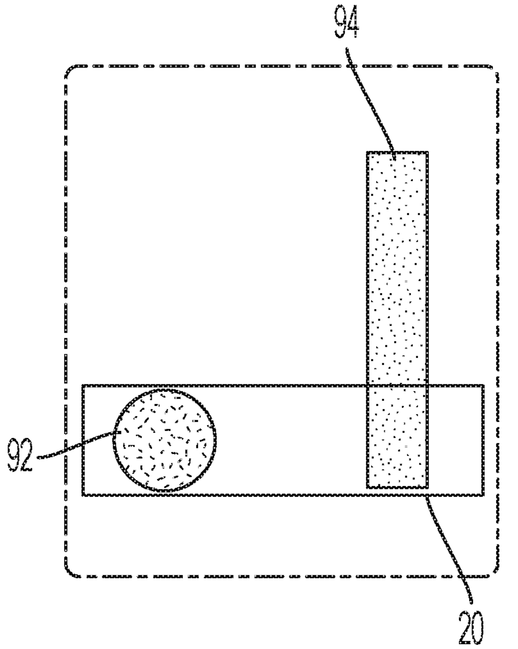

FIGS. 9A and 9B show an example of the housing 20 coupled to the body 12 of the print material container 10 with a supply key 94 to indicate whether a shaking force applied to the print material container 10 is above the shaking force threshold. The print material container 10 may include print material 14.

The detecting member of the print material container 10 includes a supply key 94 located on the housing 20. When the applied shaking force to the print material container is above the shaking force threshold; the movable mass 92 contacts and moves the supply key 94 to an end of the housing 20. When the supply key 94 is moved to the end of the housing 20, the print material container 10 is insertable into an image forming apparatus.

When the movable mass 92 is shaken; the movable mass contacts the supply key 94. The force applied to the supply key 94 moves the supply key 94 to the end of the housing. The supply key 94 has resistance against it from moving toward the end of the housing 20. The resistance may be friction due to the type of material and/or how tightly fit the supply key is located in the housing 20.

The housing 20 may be shaped as a cylinder, a rectangular box, a cube, or a variety of other shapes and sizes. The movable mass 92 may be shaped to coincide with the shape of the housing 20. The supply key 94 may be shaped as a cylinder, a rectangular box, a cube, or a variety of other shapes and sizes.

Figure 10A:
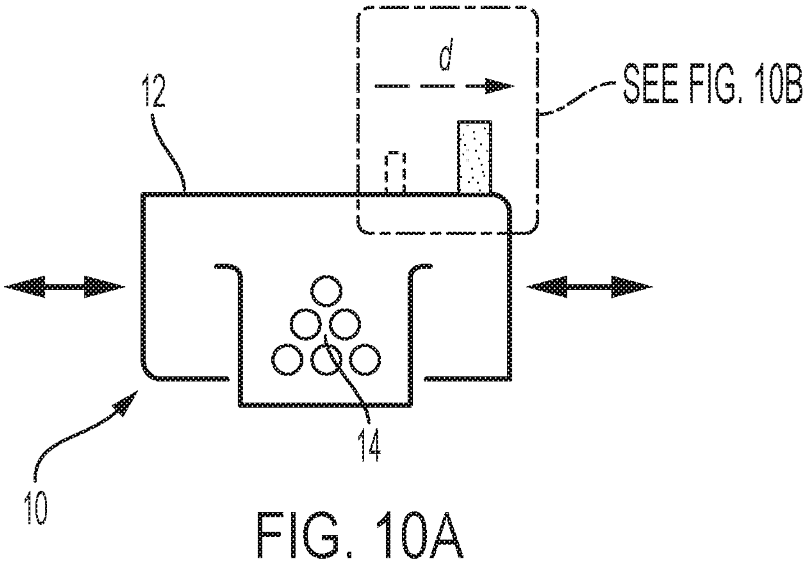
FIGS. 10A and 10B are a view of the housing with the detector supply key when it is being shook, according to an example.
Figure 10B:
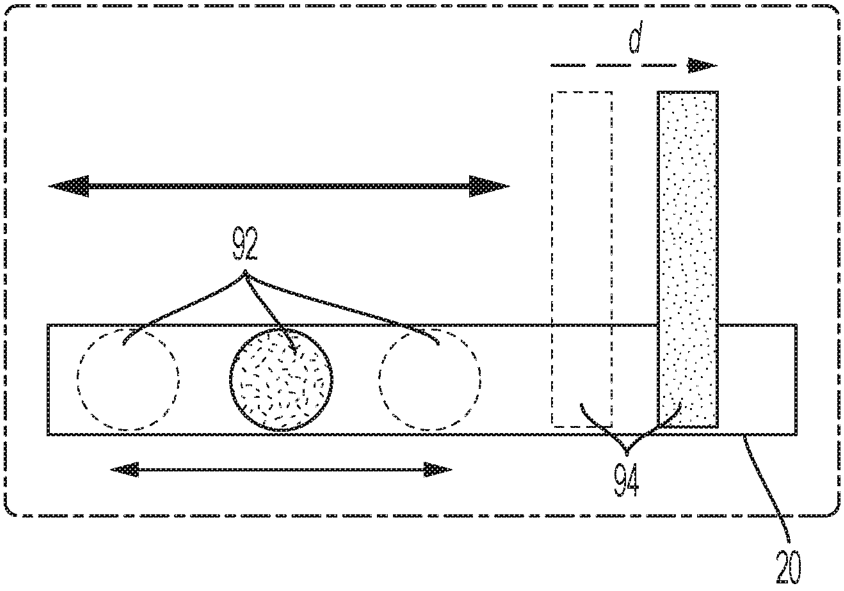

FIGS. 10A and 10B show an example of the supply key 94 moving a distance d based on the force the movable mass 92 applies to the supply key 94 and based on the frictional force of the supply 94. The force the movable mass 92 applies to the supply key 94 is based on the shaking force applied to the print material container 10.

The amount force to move the supply key 94 to the end of the housing 20 may be set to correspond to the amount of shaking force to properly disperse the print material throughout the print material container 10 either before initial insertion to an image forming apparatus or at the end of life of the print material container 10.

As can be seen in FIG. 10, the movable mass 92 moves the supply key 94 toward the end of the housing 20 in the direction d. The print material container 10 may include indicators to shake the print material container in a direction that aligns with the direction the movable mass 92 is able to move.

Figure 11:
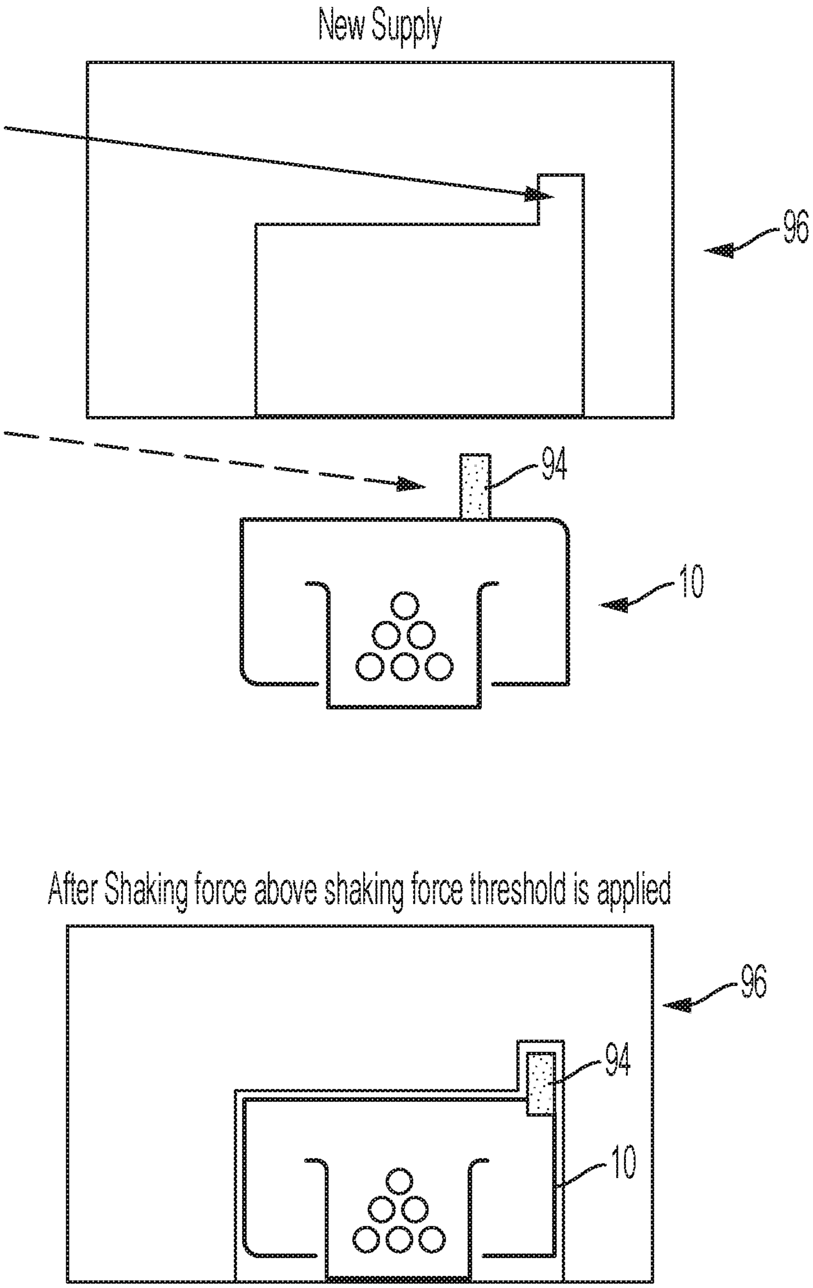
FIG. 11 is a view of the print material container with the detector supply key before the print material container has been shaken and a view of the print material container after the print material container has been shaken with a shaking force above a shaking force threshold, according to an example.

In FIG. 11, the print material container 10 is shown with the supply key 94 located on the housing before the print material container has been shaken, and a view of the print material container after the print material container has been shaken with a shaking force above a shaking force threshold.

The location of the supply key on the print material container 10 before the print material container 10 is shook above the shaking force threshold does not enable the print material container 10 to be insertable into the image forming apparatus 96.

The location of the supply key on the print material container 10 after the print material container 10 is shook above the shaking force threshold enables the print material container 10 to be insertable into the image forming apparatus 96.

The amount of shaking force to move the supply key 94 to the end of the housing so the print material container 10 is insertable into the image forming apparatus 96 may be set to correspond to the amount of shaking force to properly disperse the print material throughout the print material container 10 either before initial insertion to an image forming apparatus or at the end of life of the print material container 10.

Therefore, a user may not be able to insert the print material container 10 into the image forming apparatus 96 until the user applies enough shaking force to properly disperse the print material throughout the print material container 10.

In addition, the location of the supply key 94 may be viewable to a user. The print material container 10 may include indicators that indicate what location the supply key 94 should be moved to. This location would correspond with the amount of shaking force being applied the print material container 10 being above the shaking force threshold. Therefore, when the supply key 94 moves due to the shaking of the print material container 10, the print material container includes indicators to indicate to a user whether the shaking force applied to the print material container 10 is above the shaking force threshold.

Figure 12:
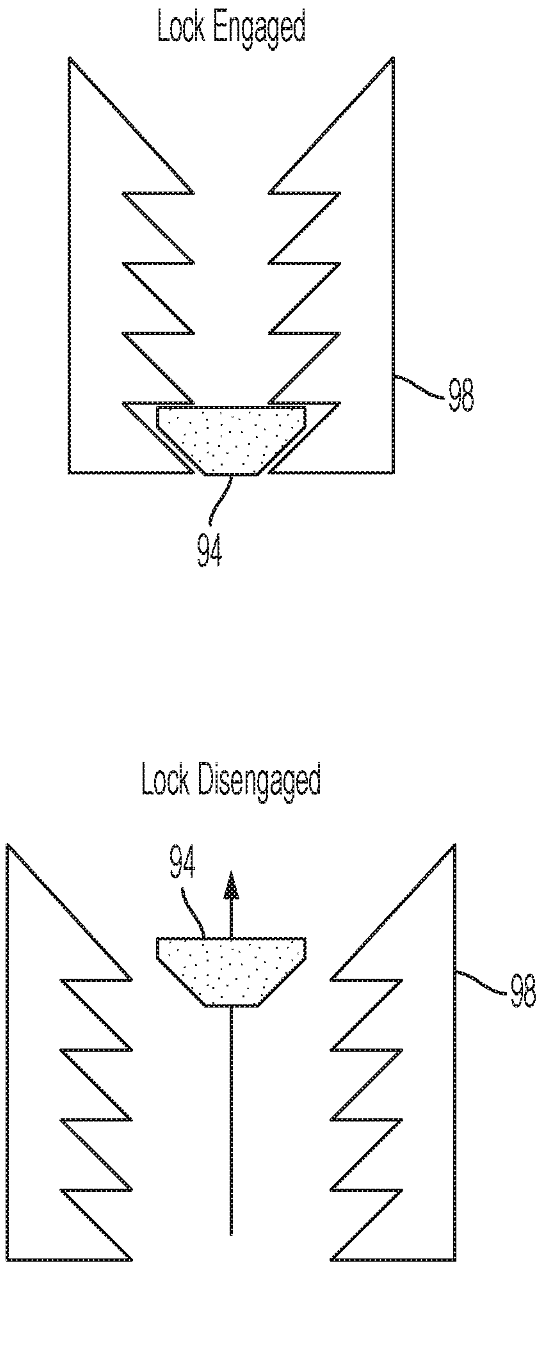
FIG. 12 is a view of a locking mechanism in the housing with the detector supply key when it is being shook, according to an example.

As can be seen in FIG. 12, the housing 20 may include a locking mechanism 98 to prevent the supply key 94 from returning to its original position when the supply key is moved to the end of the housing 20. The locking mechanism 98 may be located at the end of the housing 20. When the print material container 10 reaches an end of life the state, the locking mechanism 98 may be released to enable the supply key 94 to return to its original position. In addition, the release of the lock may also unlock an urging member to enable the urging member to move the supply key 94 back to its original position. This may be caused when the print material level is below a threshold, when the print material container has been used over a certain number of uses, or when the print material container 10 is removed from the image forming apparatus 96. A variety of other ways may also be used to cause the lock mechanism 98 to disengage.

When the supply key 94 is returned to its original position, then a user may have to apply a shaking force above the shaking force threshold to the print material container 10 to move the supply key 94 back to the end of the housing.

Thus, a user would apply a proper shaking force to the print material container 10 to consolidate the print material toward the end of life of the print material container.

Figure 13A:
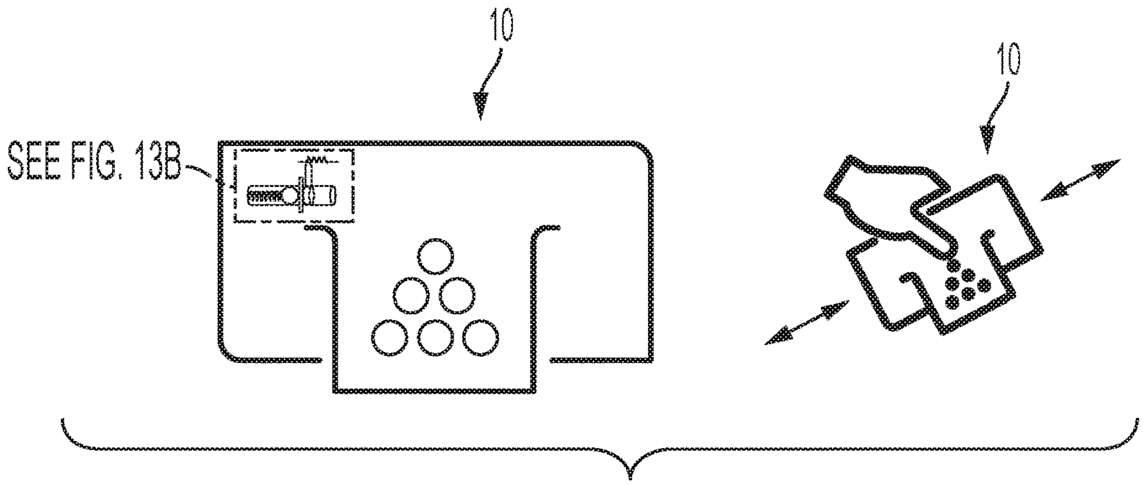
FIGS. 13A and 13B are a view of a housing with an accumulatorless shake detector with a potentiometer to detect shaking, according to an example.
Figure 13B:
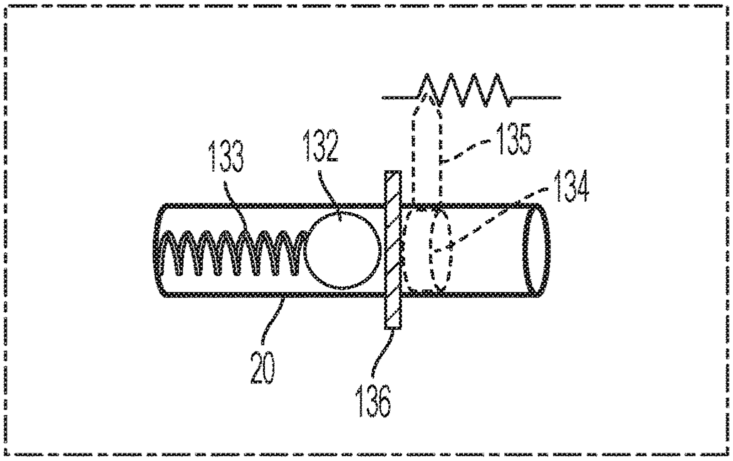

FIGS. 13A and 13B show an example of the print material container 10, where the detecting member 30 includes a slider 134, a movable mass 132, and a potentiometer. The slider 134 may be located in the housing 20. The potentiometer 135 may located on the housing 20 and coupled to the slider 134. The location of the slider 134 with respect to the potentiometer 135 determines a resistance of the potentiometer.

The housing 20 may further include a spring 133 coupled to the movable mass 132 to cause the movable mass 132 to move back and forth in the housing 20 when the shaking force is applied, wherein when the applied shaking force is above a shaking force threshold. The movable mass 132 is to move the slider 134 to a location in the housing to cause the resistance of the potentiometer 135 to be above a resistance threshold to indicate the shaking force is above the shaking force threshold. The resistance of the potentiometer 135 changes as the slider 134 moves along the potentiometer 135. When the shaking stops, the spring 133 returns the movable mass 132 to its resting position.

When the print material container 10 is inserted into an image forming apparatus, power is provided and feedback may be given based on the resistance of the potentiometer. The potentiometer 135 may be set so the resistance of the potentiometer 135 increases as the slider 134 is pushed to an end of the housing 20. The potentiometer 135 may also be set so the resistance of the potentiometer 135 decreases as the slider 134 is pushed to an end of the housing 20.

The location of the slider 134 and the resistance threshold of the potentiometer 135 may be set to correspond to the amount of shaking force to properly disperse the print material throughout the print material container 10 either before initial insertion to an image forming apparatus or at the end of life of the print material container 10. The resistance threshold to indicate the shaking force applies is above the shaking force threshold may correspond to the resistance of the potentiometer when the slider 134 is moved to the end of the housing 20.

When the image forming apparatus receives the feedback from the print material container 10 indicating the resistance of the potentiometer 135, the image forming apparatus may then indicate whether the print material container 10 needs to be shaken or whether the print material container 10 has been shaken properly.

The housing 20 may be shaped as a cylinder, a rectangular box, a cube, or a variety of other shapes and sizes. The movable mass 132 may be shaped to coincide with the shape of the housing 20. The slider 134 may be shaped to coincide with the shape of the housing 20.

The print material container 10 may include indicators to shake the print material container in a direction that aligns with the direction the movable mass 132 is able to move.

The print material container 10 may further include a removable shipping stopper 136 located between the movable mass 132 and the slider 134 in the housing 20 to prevent contact between the movable mass 132 and the slider 134 before the print material container is to be shook.

Figure 14:
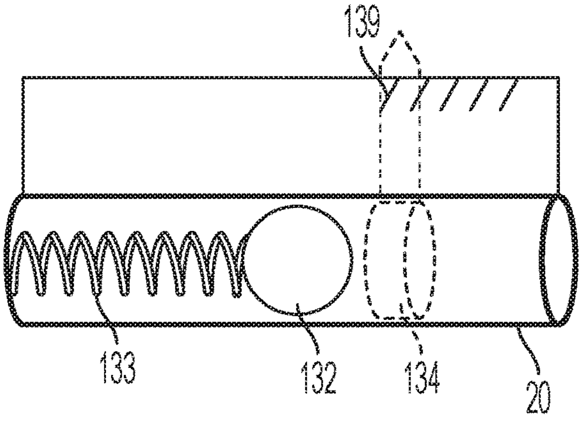
FIG. 14 is a view of a housing with an accumulatorless shake detector with a visual indicator to detect shaking, according to an example.

FIG. 14 shows an example of a visual indicator 139 coupled to the slider 134, The visual indicator 139 may indicate the location of the slider to a user without insertion of the print material container into the image forming apparatus. The location of the slider 134 may be set to correspond to the amount of shaking force to properly disperse the print material throughout the print material container 10 either before initial insertion to an image forming apparatus or at the end of life of the print material container 10. The location of the slider 134 indicating that the amount of shaking force to properly disperse the print material throughout the print material container 10 may be at the end of the housing 20.

The movable mass 132 may also be coupled to multiple springs and be able to be move along multiple axes. The movable mass 132 may then be able to move multiple sliders, with each slider being coupled to a potentiometer and/or visual indicator.

Figure 15A:
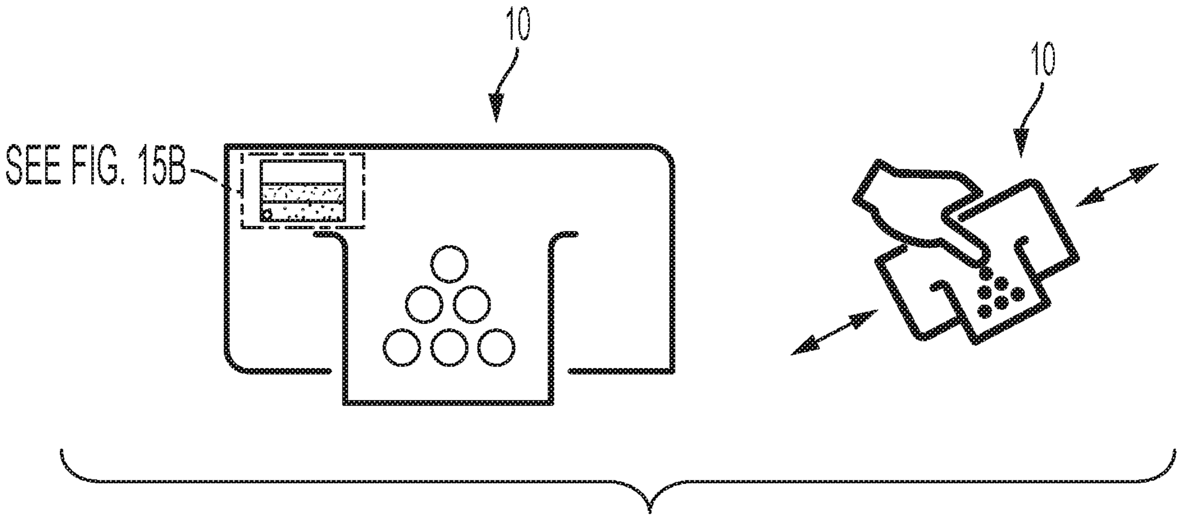
FIGS. 15A and 15B are a view of print material container with a housing that includes a shake detector having liquids to detect shaking, according to an example.
Figure 15B:
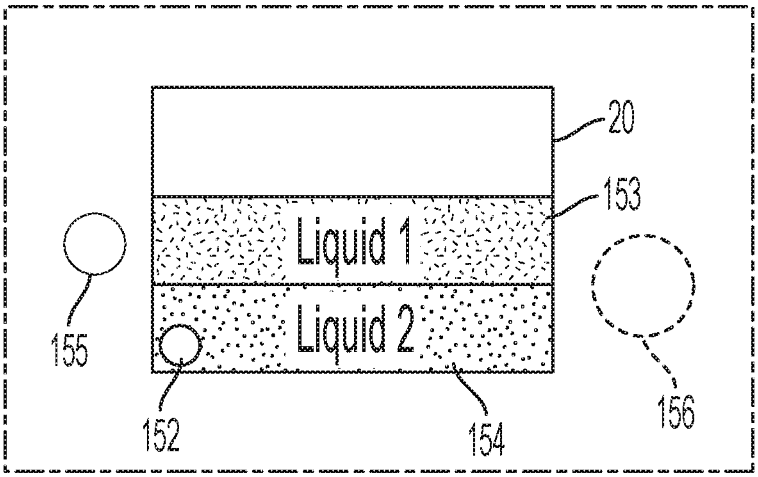

FIGS. 15A and 15B show an example of the print material container 10, where the detecting member 30 includes a first liquid 153 and a second liquid 154 located in the housing 20. The second liquid 154 has a different miscibility and/or color than the first liquid 153. When a shaking force is applied to the print material container 10, the movable mass 152 agitates the first liquid 153 and the second liquid 154. When the applied shaking force is above the shaking force threshold, the movable mass 152 agitates the first liquid 153 and the second liquid 154 to cause the first liquid and second liquid to form a mixture 155. The color and clarity of the mixture is different than the color and clarity of the first liquid 153 and the color and clarity of the second liquid 154. The color and clarity of the mixture of the first liquid 153 and second liquid 154 may indicate the shaking force is above the shaking force threshold.

The housing may further includes a light port 155 to let in light to reflect off the liquid in the housing so as to be seen by a user through the viewport 156. The first liquid 153 and the second liquid 154 are not mixed when the print material container 10 is at rest for an extended period of time due to the different miscibility between the first liquid 153 and the second liquid 154. The amount of shaking force to mix the first liquid 153 and the second liquid 154 to turn to a visible color may be set to correspond to the shaking force threshold, which may correspond to an amount of shaking force to properly disperse the print material throughout the print material container 10 either before initial insertion to an image forming apparatus or at the end of life of the print material container 10.

After the mixture 155 is formed due to the applied shaking force, the first liquid 153 and the second liquid 154 may reset back to their original form after a period of time has passed. The amount of time for the first liquid 153 and the second liquid 154 reset back to their original form will be dependent on the miscibility of first liquid and the second liquid.

When the applied shaking force is above the shaking force threshold, the first liquid 153 and the second liquid 154 are mixed to turn to a mixture that has a visible color and a high opacity. A user is then able to view this color through the viewport 156 and determine that the print material container 10 has been shaken above the shaking force threshold based on the color of the mixture. The print material container may include indicators indicating what colors indicate the print material container 10 has been shaken enough or indicate the print material container 10 needs to be shaken more.

The combined mixture 155 of the first liquid 153 and the second liquid 154 has distinct optical qualities from the first liquid 153 and the second liquid 154. Properties of the mixture may be controlled by the choices of the first liquid and the second liquid. In addition properties of the mixture may also be controlled by additive choices, amount of housing space, housing geometry, and free space.

Figure 16:
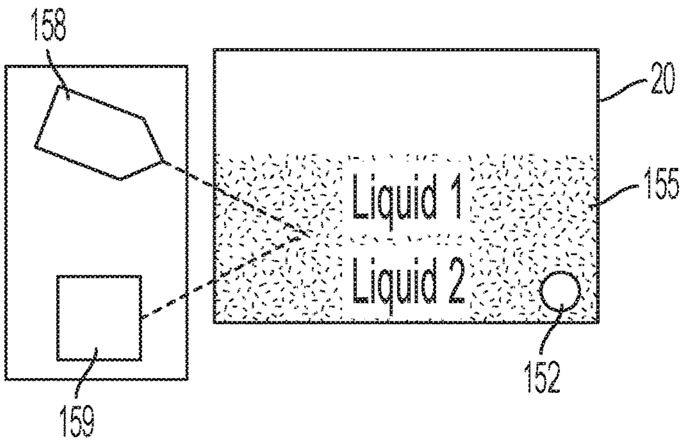
FIG. 16 is a view of an emitter and sensor to detect a color of the liquids in the housing to detect shaking, according to an example.

FIG. 16 shows the detecting member may include a light emitter 158 and a sensor 159. The light emitter 158 is to transmit light to the mixture 155. The sensor 159 is to detect light reflected from the mixture 155 or light passed through the mixture. When the detected light is a color corresponding to a color determined to indicate the shaking force applied to the print material container 10 is above the shaking force threshold, the detecting member signals the applied shaking force is above the shaking force threshold.

Figure 17:
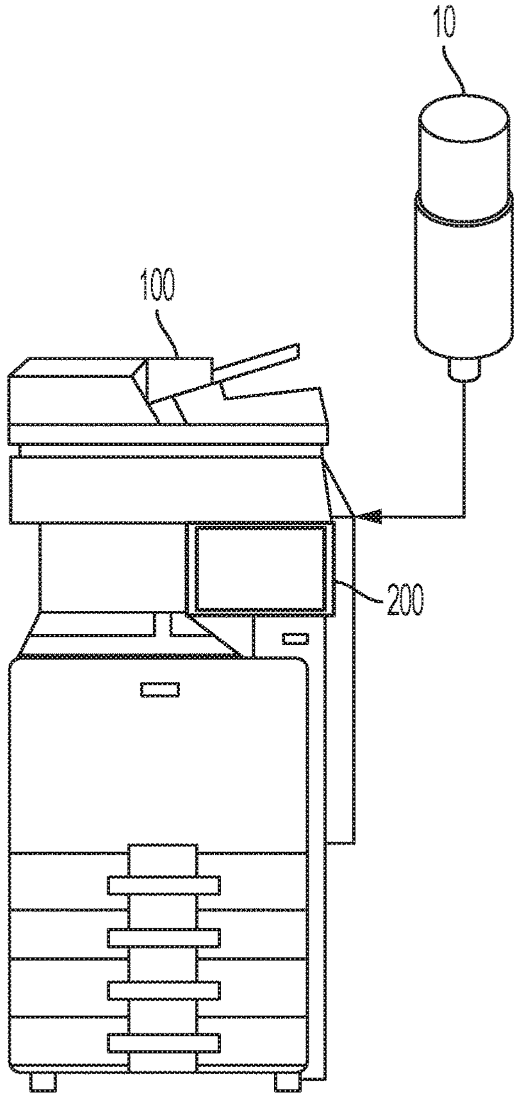
FIG. 17 is a side view of a print material container to be coupled to an image forming apparatus or intermediary apparatus providing transfer of print material to the image forming apparatus, according to an example.

When the detected light is not a color corresponding to a color determined to indicate the shaking force applied to the print material container 10 is above the shaking force threshold, the detecting member signals the applied shaking force is below shaking force threshold, FIG. 17 shows an example of a view of a print material container 10 that may be coupled to a first location of a main body of an image forming apparatus 100 to supply print material. As an image forming operation is performed in the image forming apparatus 100, the print material in the print material container at a location to supply print material is used. The image forming apparatus 100 may include a user interface 200. The print material container 10 is insertable in the image forming apparatus 100. In addition, the print material container 10 is installable in the image forming apparatus 100. The shape of the print material container 10 in FIG. 17 is an example, but the print material container 10 may be various other shapes.

Figure 18:
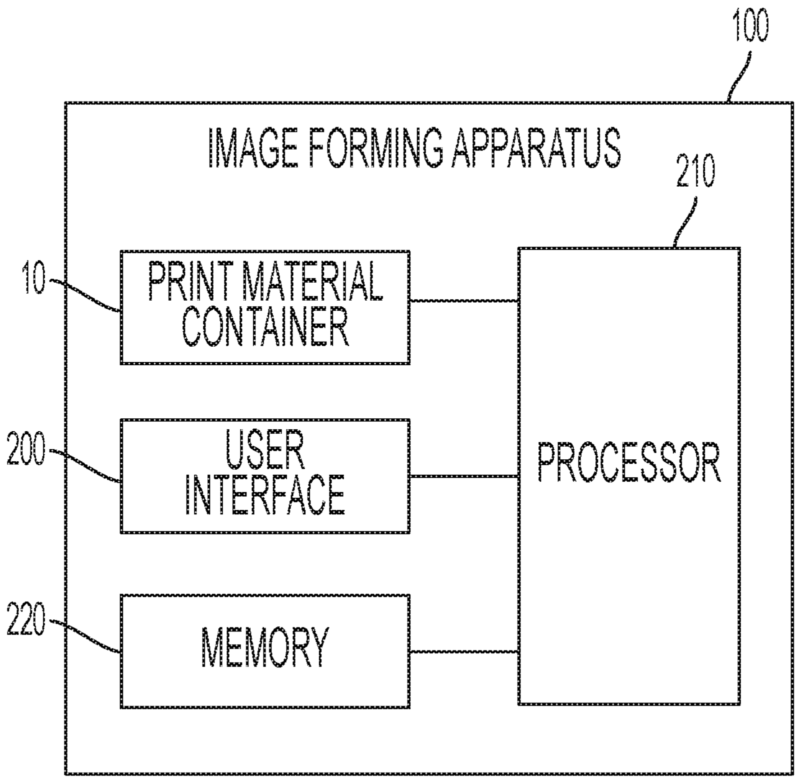
FIG. 18 is a block diagram of a configuration of an image forming apparatus, according to an example.

FIG. 18 is a block diagram of a configuration of the image forming apparatus 100, according to an example.

The image forming apparatus 100 shown in FIG. 18 may include a print material container 10, the user interface 200, a memory 220, and a processor 210. However, not all the components shown in FIG. 18 are necessary components. The image forming apparatus 100 may be embodied by using less or more components than the components shown in the drawings. Hereinafter, the components will be described.

The processor 210 may control all operations of the image forming apparatus 100 and include at least one processor like a central processing unit (CPU). The processor 210 may control other components in the image forming apparatus 100 to perform operations corresponding to the user input received through the user interface 200. The processor 210 may include at least one specialized processor corresponding to functions or an all-in-one type processor.

The processor 210 may perform the operational logic shown in FIG. 8. The processor 210 may also receive the feedback signaled from the detecting member and perform operational logic based on the received to signal to determine whether the print material container 10 has been shaken enough. The user interface 200 may indicate to a user whether the print material container 100 has been shaken enough. In addition, the image forming apparatus 100 may send a signal to user equipment to notify whether the print material container 10 has been shaken enough.

The operating method of the image forming apparatus 100 may be embodied in the form of instructions stored on a machine-readable medium and executable by a computer or a processor. The method of operating the image forming apparatus 100 may be written as computer programs and may be implemented in general-use digital computers that execute the programs using a machine readable recording medium. The above-mentioned machine readable recording medium may be read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, floppy disc, a magnet optical recording medium, an optical data recording medium, hard disc, solid-state disc (SSD), and any kind of device capable of storing instructions of machine readable instructions, relevant data, data files, and data structure and capable of providing instructions or machine readable instructions, relevant data, data files, and data structures to a processor and a computer such that the processor or computer may execute the instruction.

The foregoing examples are merely examples and are not to be construed as limiting the disclosure. The disclosure can be readily applied to other types of apparatuses. Also, the description of the examples of the disclosure is intended to be illustrative, and not to limit the scope of the claims.

While the disclosure has been described with reference to the accompanying drawings, it is to be understood that the scope of the disclosure is defined by the claims described hereinafter and should not be construed as being limited to the above-described examples and/or drawings. It is to be clearly understood that improvements, changes, and modifications that are obvious to those skilled in the art are also within the scope of the disclosure as defined in the claims.

What is claimed is:

1. A print material container comprising:

a body to hold print material;

a housing coupled to the body, the housing including a movable mass to move in the housing when a shaking force is applied to the print material container; and a detecting member to detect the shaking force and to signal a feedback of the shaking force relative to a shaking force threshold, wherein the detecting member includes: a supply key located on the housing, wherein, when the applied shaking force is above the shaking force threshold, the movable mass moves the supply key to an end of the housing.

2. An image forming apparatus, comprising:

a device to produce images or objects on a recording medium; and a print material container coupled to the device, wherein the print material container comprises:

a body to hold print material; and a housing coupled to the body, the housing including a movable mass to move in the housing when as shaking force is applied to the print material container; and a detecting member to detect the shaking force and to signal a feedback of the shaking force relative to a shaking force threshold, wherein the detecting member includes: a supply key located on the housing, wherein, when the applied shaking force is above the shaking force threshold, the movable mass moves the supply key to an end of the housing.

3. The print material container of claim 1, wherein when the supply key is moved to the end of the housing, the print material container is insertable into an image forming apparatus.

4. The print material container of claim 1, further comprising a locking mechanism located at the end of the housing to prevent the supply key from returning to its original position when the supply key is moved to the end of the housing.

5. The print material container of claim 4, wherein the locking mechanism is releasable when the print material container reaches an end-of-life state.

6. The print material container of claim 1, wherein the supply key is visible to a user, and the print material container includes indicators that indicate a proper location for the supply key corresponding to an applied shaking force above the shaking force threshold.

7. The print material container of claim 1, wherein the housing is cylindrical in shape, and the movable mass is shaped to coincide with the cylindrical shape of the housing.

8. The print material container of claim 1, wherein the print material container includes indicators to instruct a user to shake the print material container in a direction that aligns with a direction in which the movable mass is able to move.

9. The print material container of claim 1, wherein the shaking force threshold corresponds to an amount of shaking force required to properly disperse the print material throughout the print material container.

10. The print material container of claim 1, wherein the movable mass is shaped to correspond with an interior shape of the housing, and the supply key is positioned to receive direct contact from the movable mass when the shaking force is applied.

11. The print material container of claim 1, wherein the housing includes a viewport, and the location of the supply key is visible through the viewport to indicate to a user whether the applied shaking force is above the shaking force threshold.

12. The image forming apparatus of claim 2, further comprising a user interface to indicate to a user whether the print material container has been shaken with a force above the shaking force threshold based on the feedback signaled from the detecting member.

13. The image forming apparatus of claim 2, further comprising a processor to receive the feedback signaled from the detecting member and determine whether the print material container has been shaken adequately based on the position of the supply key.

14. The image forming apparatus of claim 2, wherein the image forming apparatus is configured to prevent operation when the supply key is not positioned at the end of the housing, indicating the print material container has not been shaken with a force above the shaking force threshold.

15. The image forming apparatus of claim 2, wherein the print material container further comprises a locking mechanism configured to lock the supply key at the end of the housing when the shaking force above the shaking force threshold is applied, and to release the supply key when the print material in the print material container falls below a predetermined threshold level.

16. The image forming apparatus of claim 2, wherein the image forming apparatus is configured to prompt a user to shake the print material container when the feedback from the detecting member indicates the shaking force is below the shaking force threshold.

17. The image forming apparatus of claim 2, wherein the detecting member is configured to signal the feedback to the image forming apparatus when the print material container is inserted into the image forming apparatus.

18. The image forming apparatus of claim 2, wherein the supply key is positioned such that it physically prevents the print material container from being properly inserted into the image forming apparatus until the shaking force above the shaking force threshold has been applied.

19. The image forming apparatus of claim 2, wherein the image forming apparatus is configured to transmit a signal to user equipment to notify whether the print material container has been shaken with a force above the shaking force threshold.

* * * * *